United States Patent
Cui et al.

(10) Patent No.: US 9,998,530 B2
(45) Date of Patent: Jun. 12, 2018

(54) DISTRIBUTED GLOBAL LOAD-BALANCING SYSTEM FOR SOFTWARE-DEFINED DATA CENTERS

(71) Applicant: Nicira, Inc., Palo Alto, CA (US)

(72) Inventors: Liang Cui, Beijing (CN); Hailing Xu, Peking (CN); Dongping Chen, Shanghai (CN)

(73) Assignee: NICIRA, INC., Palo Alto, CA (US)

( * ) Notice: Subject to any disclaimer, the term of this patent is extended or adjusted under 35 U.S.C. 154(b) by 655 days.

(21) Appl. No.: 14/054,716

(22) Filed: Oct. 15, 2013

(65) Prior Publication Data

US 2015/0106523 A1   Apr. 16, 2015

(51) Int. Cl.
*H04L 29/08* (2006.01)

(52) U.S. Cl.
CPC ...... *H04L 67/1036* (2013.01); *H04L 67/1008* (2013.01); *H04L 67/1021* (2013.01); *H04L 67/1034* (2013.01)

(58) Field of Classification Search
CPC ............. H04L 67/1036; H04L 67/1008; H04L 67/1021; H04L 67/1034
See application file for complete search history.

(56) References Cited

U.S. PATENT DOCUMENTS

| | | | |
|---|---|---|---|
| 6,104,700 A | 8/2000 | Haddock et al. | |
| 6,249,801 B1 * | 6/2001 | Zisapel | G06F 9/505 718/105 |
| 6,324,580 B1 * | 11/2001 | Jindal | G06F 9/505 709/228 |
| 6,327,622 B1 * | 12/2001 | Jindal | G06F 9/5055 709/228 |

(Continued)

FOREIGN PATENT DOCUMENTS

| | | | | |
|---|---|---|---|---|
| EP | 2748713 | | 7/2014 | |
| IL | CA 2425042 A1 * | | 1/2004 | ......... H04L 12/2697 |

(Continued)

OTHER PUBLICATIONS

Author Unknown, "Enabling Service Chaining on Cisco Nexus 1000V Series," Month Unknown, 2012, 25 pages, Cisco.

(Continued)

*Primary Examiner* — Uzma Alam
(74) *Attorney, Agent, or Firm* — Adeli LLP

(57) ABSTRACT

The disclosure herein describes a system for providing distributed global server load balancing (GSLB) over resources across multiple data centers. The system includes a directory group comprising one or more directory nodes and a plurality of GSLB nodes registered to the directory group. A respective GSLB node is configured to provide GSLB services over a respective portion of the resources. A directory node includes a domain name system (DNS) query-receiving module configured to receive a DNS query from a client, a node-selecting module configured to select from the plurality of GSLB nodes a first GSLB node based at least on the DNS query, and a DNS query-responding module configured to respond to the DNS query to the client using an address of the selected first GSLB node, thereby facilitating the selected first GSLB node in performing GSLB while resolving the DNS query.

19 Claims, 6 Drawing Sheets

(56) References Cited

U.S. PATENT DOCUMENTS

| | | | |
|---|---|---|---|
| 7,254,626 B1* | 8/2007 | Kommula | H04L 67/1008 709/217 |
| 7,463,648 B1* | 12/2008 | Eppstein | G06F 9/5011 370/468 |
| 7,496,651 B1* | 2/2009 | Joshi | H04L 29/12792 709/217 |
| 7,512,702 B1* | 3/2009 | Srivastava | H04L 45/00 370/236 |
| 7,523,181 B2* | 4/2009 | Swildens | H04L 12/14 370/229 |
| 7,574,499 B1* | 8/2009 | Swildens | G06F 9/505 709/202 |
| 7,653,700 B1* | 1/2010 | Bahl | H04L 12/2602 709/216 |
| 7,657,629 B1* | 2/2010 | Kommula | H04L 29/12066 709/226 |
| 7,676,576 B1* | 3/2010 | Kommula | G06F 1/3209 709/223 |
| 7,725,602 B2* | 5/2010 | Liu | H04L 29/12066 709/217 |
| 7,818,452 B2 | 10/2010 | Matthews et al. | |
| 7,948,986 B1 | 5/2011 | Ghosh et al. | |
| 8,190,767 B1 | 5/2012 | Maufer et al. | |
| 8,234,650 B1* | 7/2012 | Eppstein | G06F 9/5072 709/220 |
| 8,458,298 B2* | 6/2013 | Josefsberg | H04L 41/0654 709/220 |
| 8,605,132 B1* | 12/2013 | Swanson | H04N 7/152 348/14.01 |
| 9,059,999 B2 | 6/2015 | Koponen et al. | |
| 2002/0059170 A1* | 5/2002 | Vange | G06F 9/5027 |
| 2002/0120743 A1* | 8/2002 | Shabtay | H04L 67/1008 709/226 |
| 2002/0129134 A1* | 9/2002 | Leighton | H04L 12/2697 709/223 |
| 2003/0093481 A1 | 5/2003 | Mitchell et al. | |
| 2004/0024861 A1* | 2/2004 | Coughlin | G06F 9/5083 709/224 |
| 2004/0133690 A1* | 7/2004 | Chauffour | H04L 29/06 709/229 |
| 2004/0240468 A1* | 12/2004 | Chin | H04L 29/12066 370/466 |
| 2005/0132030 A1 | 6/2005 | Hopen et al. | |
| 2005/0249199 A1 | 11/2005 | Albert et al. | |
| 2007/0061492 A1 | 3/2007 | van Riel | |
| 2007/0174660 A1* | 7/2007 | Peddada | H04L 41/0663 714/4.1 |
| 2008/0005293 A1 | 1/2008 | Bhargava et al. | |
| 2008/0031263 A1 | 2/2008 | Ervin et al. | |
| 2008/0049614 A1 | 2/2008 | Briscoe et al. | |
| 2008/0049786 A1 | 2/2008 | Ram et al. | |
| 2008/0072305 A1 | 3/2008 | Casado et al. | |
| 2008/0104608 A1 | 5/2008 | Hyser et al. | |
| 2008/0114888 A1* | 5/2008 | Bhatt | H04L 63/1416 709/231 |
| 2008/0279196 A1 | 11/2008 | Friskney et al. | |
| 2008/0282254 A1* | 11/2008 | Blander | H04L 67/1029 718/105 |
| 2009/0129271 A1 | 5/2009 | Ramankutty et al. | |
| 2009/0235325 A1 | 9/2009 | Dimitrakos et al. | |
| 2009/0300210 A1 | 12/2009 | Ferris | |
| 2009/0303880 A1 | 12/2009 | Maltz et al. | |
| 2009/0327464 A1 | 12/2009 | Archer et al. | |
| 2010/0131638 A1 | 5/2010 | Kondamuru | |
| 2010/0131960 A1* | 5/2010 | Suganthi | H04L 63/0272 718/105 |
| 2010/0223364 A1* | 9/2010 | Wei | H04L 29/04 709/220 |
| 2011/0022695 A1 | 1/2011 | Dalal et al. | |
| 2011/0153840 A1* | 6/2011 | Narayana | H04L 67/1029 709/227 |
| 2011/0268118 A1 | 11/2011 | Schlansker et al. | |
| 2011/0314119 A1* | 12/2011 | Kakadia | H04L 29/12066 709/213 |
| 2012/0030341 A1* | 2/2012 | Jensen | H04L 67/2804 709/224 |
| 2012/0144014 A1 | 6/2012 | Natham et al. | |
| 2012/0155266 A1 | 6/2012 | Patel et al. | |
| 2012/0207174 A1 | 8/2012 | Shieh | |
| 2013/0073743 A1 | 3/2013 | Ramasamy et al. | |
| 2013/0132532 A1 | 5/2013 | Zhang et al. | |
| 2013/0163594 A1 | 6/2013 | Sharma et al. | |
| 2013/0227097 A1 | 8/2013 | Yasuda et al. | |
| 2013/0227550 A1 | 8/2013 | Weinstein et al. | |
| 2013/0332983 A1 | 12/2013 | Koorevaar et al. | |
| 2014/0068602 A1 | 3/2014 | Gember et al. | |
| 2014/0115578 A1 | 4/2014 | Cooper et al. | |
| 2014/0195666 A1 | 7/2014 | Dumitriu et al. | |
| 2014/0304412 A1* | 10/2014 | Prakash | H04L 61/1511 709/226 |
| 2015/0106523 A1* | 4/2015 | Cui | H04L 67/1036 709/226 |

FOREIGN PATENT DOCUMENTS

| | | |
|---|---|---|
| JP | 2005-311863 | 11/2005 |
| WO | WO 99/18534 | 4/1999 |
| WO | WO 2008/095010 | 8/2008 |
| WO | WO 2013/074844 | 5/2013 |

OTHER PUBLICATIONS

Author Unknown. "AppLogic Features," Jul. 2007, 2 pages, 3TERA, Inc., available at http://web.archive.org/web/2000630051607/www.3tera.com/applogic-features.html.

Dixon, Colin, et al., "An End to the Middle," Proceedings of the 12th conference on Hot topics in operating systems USENIX Association, May 2009, pp. 1-5, Berkeley, CA, USA.

Greenberg, Albert, et al., "VL2: A Scalable and Flexible Data Center Network," SIGCOMM'09, Aug. 17-21, 2009, pp. 51-62, ACM, Barcelona, Spain.

Guichard, J., et al., "Network Service Chaining Problem Statement," Network Working Group, Jun. 13, 2013, 14 pages, Cisco Systems, Inc.

Joseph, Dilip Antony, et al., "A Policy-aware Switching Layer for Date Centers," Jun. 24, 2008, 26 pages, Electrical Engineering and Computer Sciences, University of California, Berkeley, CA, USA.

Sekar, Vyas, et al., "Design and Implementation of a Consolidated Middlebox Architecture," 9th USENIX conference on Networked System Design and Implementation, Apr. 25-27, 2012, 14 pages.

Sherry, Justine, et al., "Making Middleboxes Someone Else's Problem: Network Processing as a Cloud Service," SSIGCOMM, Aug. 13-17, 2012, 12 pages, ACM, Helsinki, Finland.

* cited by examiner

| Metadata | |
|---|---|
| | GslbNode_ID, IP, Location |
| Replicas | GslbNode_4, GslbNode_5 |
| Global IPs | Global_IP_1: www.abc.com<br>Global_IP_2: support.abc.com<br>... |
| Pools | Pool 1: VIP1, VIP2, VIP3<br>Pool 2: VIP4, VIP5 |
| Sites | Site 1: Beijing, VIP1, VIP2<br>Site 2: Tokyo, VIP3, VIP4, VIP5 |

FIG. 3

| | Metadata |
|---|---|
| | GslbDirNode_ID, IP |
| Global IP Mapping Table | Global_IP_1: GslbNode_1, GslbNode_2<br>Global_IP_2: GslbNode_3, GslbNode_1<br>... |
| GSLB Nodes Namespace | GslbNode_1: IP, Status, Location, Replica<br>GslbNode_2: IP, Status, Location, Replica<br>... |

FIG. 2

DISTRIBUTED GLOBAL LOAD-BALANCING SYSTEM FOR SOFTWARE-DEFINED DATA CENTERS

BACKGROUND

Global Server Load Balancing (GSLB) based on Domain Name System (DNS) is an essential technology used in modern day data centers. GSLB allows a service provider to distribute workloads across multiple data centers. As a result, GSLB facilitates more evenly distributed traffic, business continuance, and disaster recovery. GSLB devices can be deployed with each data center and registered with an upper-level DNS server. These GSLB devices are typically synchronized with respect to the data centers' service state. The GSLB devices can resolve DNS queries (e.g., by returning the IP address of a selected data center) based on defined load-balancing policies, either static or dynamic. In addition, the GSLB devices typically monitor the health status of all the services independently. However, when a customer maintains a large number of data centers, registering a corresponding number of GSLB devices with a third-party DNS service can be difficult. It can also be costly, both in terms of bandwidth consumption and computation, to synchronize the data-center state information across different GSLB devices. As the number of data centers increases, the associated high capital expenditure (CapEx) and operational expenditure (OpEx), increased management and configuration overhead, scalability issues, and resilience issues can make the current GSLB solutions prohibitively expensive.

Furthermore, the emergence of software-defined data centers (SDDCs) which facilitates a significantly increased number of virtual data centers can exacerbate the aforementioned problems. SDDC expands beyond server virtualization, and facilitates virtualization of a wide variety of data center resources and services by operating data centers on community hardware rather than dedicated hardware devices SDDC is capable of providing customers with virtual data centers (VDC), which require network isolation, large layer 2 broadcast domains, dedicated network services, and greater scalability. A single hardware-based GSLB device dedicated to a physical data center might not be sufficient to meet such requirements.

In an SDDC environment, a physical data center (also known as a site) may support multiple tenants, each demanding dedicated GSLB service. As the number of sites increases and the number of customers being supported also increases, a large number of GSLB devices (which are likely to be virtualized) are needed. For example, for the virtual desktop application, the number of data center sites may exceed 50, and the number of GSLB devices needed per site may be even larger, such as hundreds or thousands. Current GSLB technologies are not suited for scaling up because registering such a large number (>1000) of GSLB devices to upper-level DNS servers is nearly impossible. In addition, heartbeat monitoring, collaboration, and synchronization among a large number of GSLB devices can be extremely troublesome, especially over the Internet.

SUMMARY

The disclosure herein describes a system for providing distributed global server load balancing (GSLB) over resources across multiple data centers. The system includes a directory group comprising one or more directory nodes and a plurality of GSLB nodes registered to the directory group. A respective GSLB node is configured to provide GSLB services over a respective portion of the resources. A directory node includes a domain name system (DNS) query-receiving module configured to receive a DNS query from a client, a node-selecting module configured to select from the plurality of GSLB nodes a first GSLB node based at least on the DNS query, and a DNS query-responding module configured to respond the DNS query to the client using an address of the selected first GSLB node, thereby facilitating the selected first GSLB node in performing GSLB while resolving the DNS query.

BRIEF DESCRIPTION OF FIGURES

FIG. 2 presents a table illustrating the exemplary metadata maintained by a GSLB directory node.

FIG. 3 presents a table illustrating the exemplary metadata maintained by a general GSLB node.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The present disclosure describes a system and a method that provide distributed GSLB services to meet the requirements of high scalability, high performance, and high availability in SDDC. More specifically, the GSLB devices include two layers: a directory layer and a service layer. The directory layer includes a small number of GSLB directory nodes (GslbDirNodes), and the service layer includes a large number of general GSLB nodes (GslbNodes). The GSLB directory nodes maintain the metadata of all general GSLB nodes, and provide mapping between global IPs (which represent different services) and the general GSLB nodes (each may provide GSLB services for a number of global IPs). In addition, the GSLB directory nodes monitor the health of all general GSLB nodes. In one embodiment, the GSLB directory nodes receive heartbeat messages from the general GSLB nodes. During operation, the GSLB directory nodes direct client DNS requests to an appropriate general GSLB node, which serves the final DNS queries from clients. A general GSLB node holds GSLB configuration for the domains (or global IPs) it supports as well as runtime data, such as a round-trip time (RTT) cache and a persistence cache, and monitors the health of the services. The RTT cache enables the general GSLB node to run RTT-based GSLB algorithm much more quickly, because no RTT measurement is needed if the RTT data associated with a particular client has been cached at the GSLB node. The number of GSLB directory nodes is kept small to minimize the traffic need for state synchronization among these directory nodes. On the other hand, there may be hundreds, even thousands, of general GSLB nodes in the system.

Figure 1:
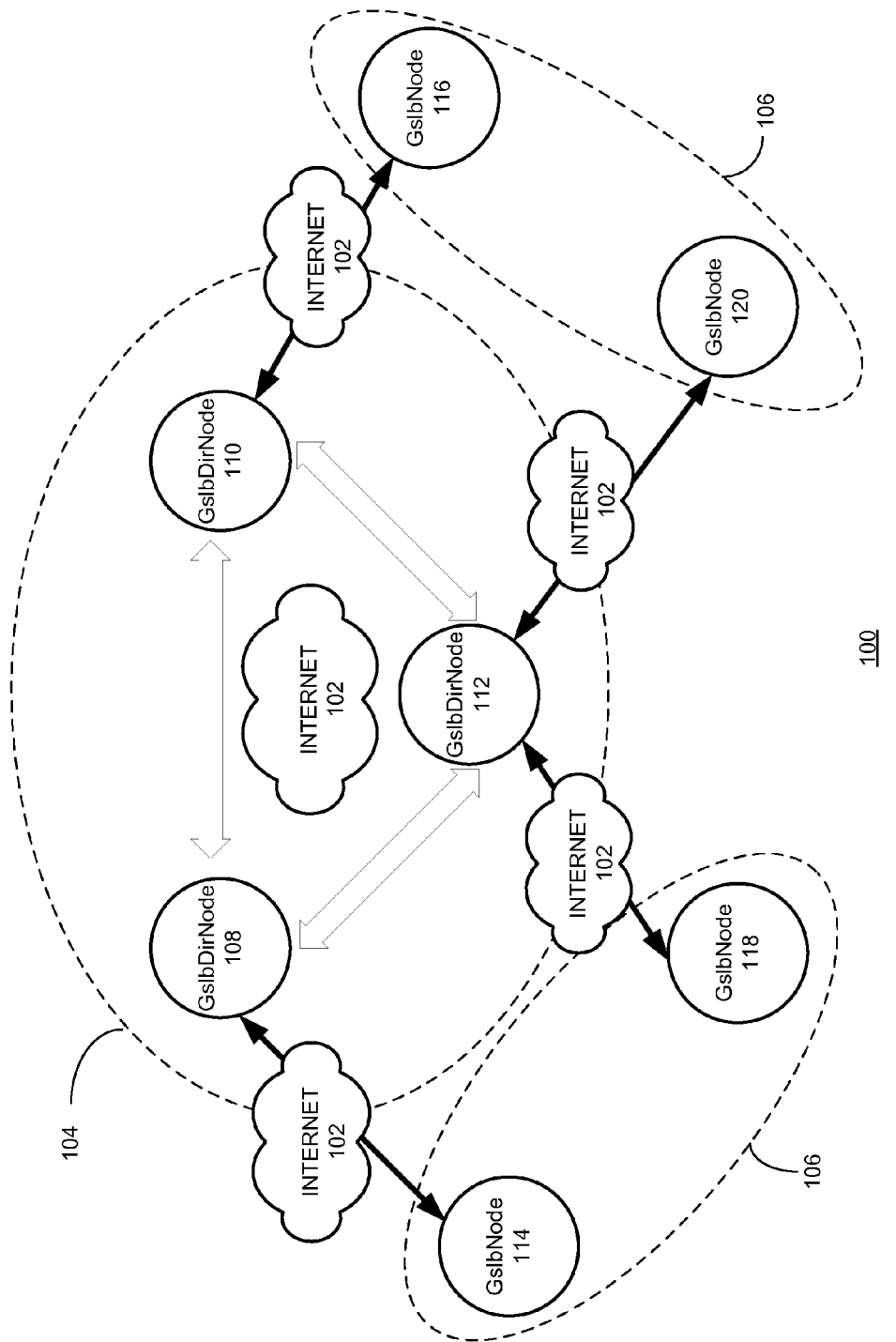
FIG. 1 presents a diagram illustrating an exemplary distributed GSLB system.

FIG. 1 presents a diagram illustrating an exemplary distributed GSLB system. In FIG. 1, distributed GSLB system 100 includes a directory layer 104 and a service layer 106. Directory layer 104 includes a number of GSLB directory nodes, such as GslbDirNodes 108, 110, and 112. Service layer 106 includes a number of general GSLB nodes, such as GslbNodes 114, 116, 118, and 120.

The few GSLB directory nodes (in the example shown in FIG. 1, there are three GslbDirNodes) are deployed across the multiple geographically dispersed sites, and form a directory group (GslbDirGroup). In the environment of multi-tenant data centers, each tenant can establish its own GslbDirGroup. Note that the number of sites can be much larger than the number of the GSLB directory nodes. For example, to provide virtual desktop services for customers across the globe, over 50 sites may be needed. These GslbDirNodes are registered with DNS providers as the authoritative name server for the fully qualified domain names (FQDNs) of the service. For example, when a customer tries to log on to the virtual desktop service, the DNS query for the service is directed to one of the GSLB directory nodes by the upper-layer DNS server. In one embodiment, the GslbDirNodes register their virtual IPs to the DNS providers as the authoritative name server for the virtual desktop service such that client DNS queries will be recursively directed to these GslbDirNodes. Note that the DNS response may list all GSLB directory nodes within the directory group, and the client can choose to send DNS queries to any one of the GSLB directory nodes. The directory nodes do not respond to the client DNS queries directly, but direct the DNS queries to proper general GSLB nodes based on the domain name included in the DNS query, because different GSLB nodes may support different domain names. In a further embodiment, when there are multiple GSLB nodes supporting the queried domain name, the directory node may select a GSLB node based on the physical proximity to the client.

As shown in FIG. 1, multiple GSLB directory nodes are spread across Internet 102. Resilience can be supported within a GSLB directory group. To do so, persistent connections among the GSLB directory nodes within a directory group are maintained to sync-up state data among all GSLB directory nodes. Note that the GSLB directory nodes do not maintain any runtime data. Hence, synchronization can be simple. In one embodiment, the directory nodes exchange heartbeat messages among each other. Because these directory nodes are fully synchronized, if one fails, the other surviving ones can provide the same services. The registration between the GSLB directory group and the DNS server changes only when membership within the directory group changes, i.e., only when a GSLB directory node is added or deleted. Because the number of directory node is low, such occurrences tend to be rare. On the other hand, no change to the DNS registration is required when a general GSLB node is added or removed by the data center tenants. Note that the GslbDirNodes can be deployed in existing virtual data centers or be placed in dedicated locations across the Internet. It is also possible to place a GslbDirNode and a general GSLB node in the same physical enclosure, such as a server box.

In one embodiment, each GslbDirNode maintains the metadata of all general GSLB nodes registered to the GslbDirGroup and monitors the health of these general GSLB nodes. FIG. 2 presents a table illustrating the exemplary metadata maintained by a GSLB directory node. In the example shown in FIG. 2, each GslbDirNode maintains two records: a global IP mapping table and a list of general GSLB nodes within the GSLB namespace. The global IP mapping table provides mappings between the global IPs (which can be virtual IPs) and the individual GSLB nodes that support these global IPs. In this disclosure, a global IP can be a virtual IP address that maps a domain name (such as a FQDN) to one or more pools of servers that host the domain's content, such as a website, an e-commerce site, or a content delivery network. Note that such a mapping is often many-to-many with a general GSLB node being mapped to multiple global IPs (because a single site may provide services for multiple domain names), and a particular global IP being mapped to multiple GSLB nodes (because a single service or a domain name may be supported at multiple sites). In FIG. 2, Global_IP_1 is supported by both GslbNode_1 and GslbNode_2, and Global_IP_2 is supported by both GslbNode_1 and GslbNode_3, meaning that a DNS query for domain name Global_IP_1 can be directed to either GslbNode_1 or GslbNode_2, and a DNS query for domain name Global_IP_2 can be directed to GslbNode_1 or GslbNode_3.

The other record maintained by the GslbDirNode is the GSLB namespace, which includes all general GslbNodes registered to the GSLB directory group. In one embodiment, one entry is kept for each general GSLB node. Each entry includes the name of the general GSLB node, its IP address, its status, its location, and the identifications of its one or more replica nodes. During operation, the GslbDirNode can use the namespace record to balance queries among all GSLB nodes. For example, the location information maintained in the metadata enables the GslbDirNode to identify a GSLB node that is geographically close to the client sending the DNS query, and the status information enables the GslbDirNode to determine the availability of a GSLB node.

The metadata associated with a general GSLB node (GslbNode) is reported to the GslbDirNodes when the GslbNode registers itself with the GslbDirGroup. In one embodiment, each GslbNode holds GSLB configurations for the sites it manages. In addition, runtime data, such as the RTT cache and the persistence cache, may also be maintained by the GslbNode. In one embodiment, one GslbNode is deployed at each virtual data center, and the GslbNode can be configured to run a normal GSLB service across multiple sites. For example, a GslbNode deployed in the Beijing VDC may manage server pools located in both the Beijing VDC and the Tokyo VDC. However, unlike the conventional GSLB system, the general GSLB nodes in the distributed system do not communicate or synchronize with other general GSLB nodes, with the exception of sending replica information to selected replica nodes. Instead of maintaining synchronization with other GslbNodes, a GslbNode only communicates with the GslbDirNodes. In one embodiment, a GslbNode registers itself to a GslbDirGroup (which can include a few GslbDirNodes) and reports its metadata to one of the GslbDirNodes. In addition, the GslbNode periodically sends heartbeat messages to the GslbDirNodes, and the GslbDirNodes may issue commands (such as replica commands) to the GslbNode.

FIG. 3 presents a table illustrating the exemplary metadata maintained by a general GSLB node. The metadata for a general GSLB node includes its ID (GslbNode_ID), its IP address, and its physical location. In addition, the metadata includes the identifications of replica nodes of the current GslbNode. In the example shown in FIG. 3, the replica nodes for the current GslbNode are GslbNode_4 and Gslb-Node_5. The metadata also includes global IPs supported by this GslbNode, and server pools and sites managed by this GslbNode. These server pools and sites are bound to the GslbNode during configuration of the GslbNode. Note that each server pool may include multiple virtual IPs (VIPs), with each VIP associated with a number of physical servers. The sites represent the virtual data centers that are bound to the GslbNode. In one embodiment of the present invention, one GslbNode is deployed at each virtual data center, and can be bound to multiple server pools and multiple sites. Note that for SDDCs the boundaries of the server pools and the data center sites may cross each other.

Figure 4:
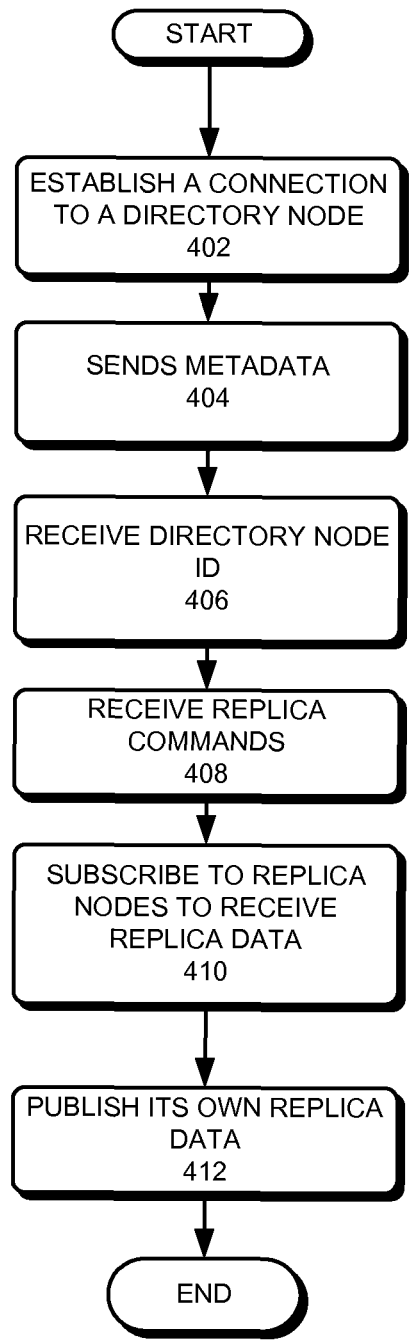
FIG. 4 presents a flowchart illustrating an exemplary process of registering a general GSLB node to a GSLB directory group.

When a new general GSLB node is added, it registers itself with the GSLB directory group. The registration process includes reporting metadata and establishing replicas. FIG. 4 presents a flowchart illustrating an exemplary process of registering a general GSLB node to a GSLB directory group. When a general GSLB node is added, during startup, the new GSLB node establishes a connection to one of the GSLB directory nodes within the directory group (operation 402), and sends its metadata to the GSLB directory node, which stores the metadata in its record tables (operation 404). In one embodiment, the metadata includes, but is not limited to: the ID of the GSLB node, its IP address, a set of global IPs (or domain names) supported by the GSLB node, and the location of the GSLB node. The new GSLB node then receives the directory node ID (Gslb-DirNode_ID) (operation 406). Subsequently, the GSLB directory node determines one or more replica nodes for the newly added GslbNode, and the newly added GslbNode receives replica commands from the directory node (operation 408). In one embodiment, the replica commands specify the node IDs of the replica nodes. Note that the replica nodes may be randomly selected or be selected based on physical proximity. Upon receiving the replica commands, the newly added GSLB node subscribes to the one or more replica nodes to receive replica data (operation 410). In one embodiment, the replica data includes the metadata maintained at a particular GSLB node and the runtime cache data. After receiving the replica data, the newly added GSLB data can act as a backup to the replica nodes. If one of the replica nodes fails, DNS queries directed to that replica node may be directed to this newly added GSLB node. The newly added GSLB node can also act as a primary node by publishing its replica data (operation 412). In one embodiment, each GSLB node periodically publishes its replica data to allow the replica nodes to update the received replica data regularly. Note that, although during registration the GSLB node only submits its metadata to one of the GSLB directory nodes, because all directory nodes within the GSLB directory group maintain state synchronization, the other directory nodes will receive a copy of the metadata of the newly added GSLB data. There is no need to notify the DNS server of changes regarding the addition/removal of a GSLB node. Also, note that, because there are only a few GSLB directory nodes (often an odd number), the addition of a new GSLB node does not generate excessive network traffic. On the other hand, when the GSLB configuration changes at the GSLB node, such as addition or removal of a server or pool of servers, such a configuration change only affects the corresponding GSLB node. There is no need for the GSLB node to synchronize its status with the large number of other GSLB nodes. As a result, no excessive traffic will be generated because of the GSLB configuration change.

After a GSLB node is registered with the GSLB directory group, it may receive client DNS queries directed by the GslbDirNodes. The GslbNode also periodically sends heartbeat messages to at least one of the GslbDirNodes to confirm that it is operating. In one embodiment, the GslbNode periodically sends the heartbeat messages to the Gslb-DirNode it is registered to. The heartbeat messages can carry runtime statistics of the GslbNode such that the Gslb-DirNodes within the GslbDirGroup can balance DNS queries among all GSLB nodes based on the runtime statistics associated with the GSLB nodes. While in operation, if one GslbNode is down, the GslbDirNode will select another GslbNode to serve the DNS queries originally directed to the failed GslbNode. In one embodiment, the GslbDirNode may select one of the replica nodes of the failed GslbNode to serve the DNS queries. Note that the replica information is maintained by the directory nodes. In a different embodiment, the GslbDirNode may select a GslbNode that is not a replica of the failed GslbNode. In such a situation, the GslbDirNode will send a command to a replica of the failed GslbNode, requesting the replica node to send replica data to the selected GslbNode.

Figure 5:
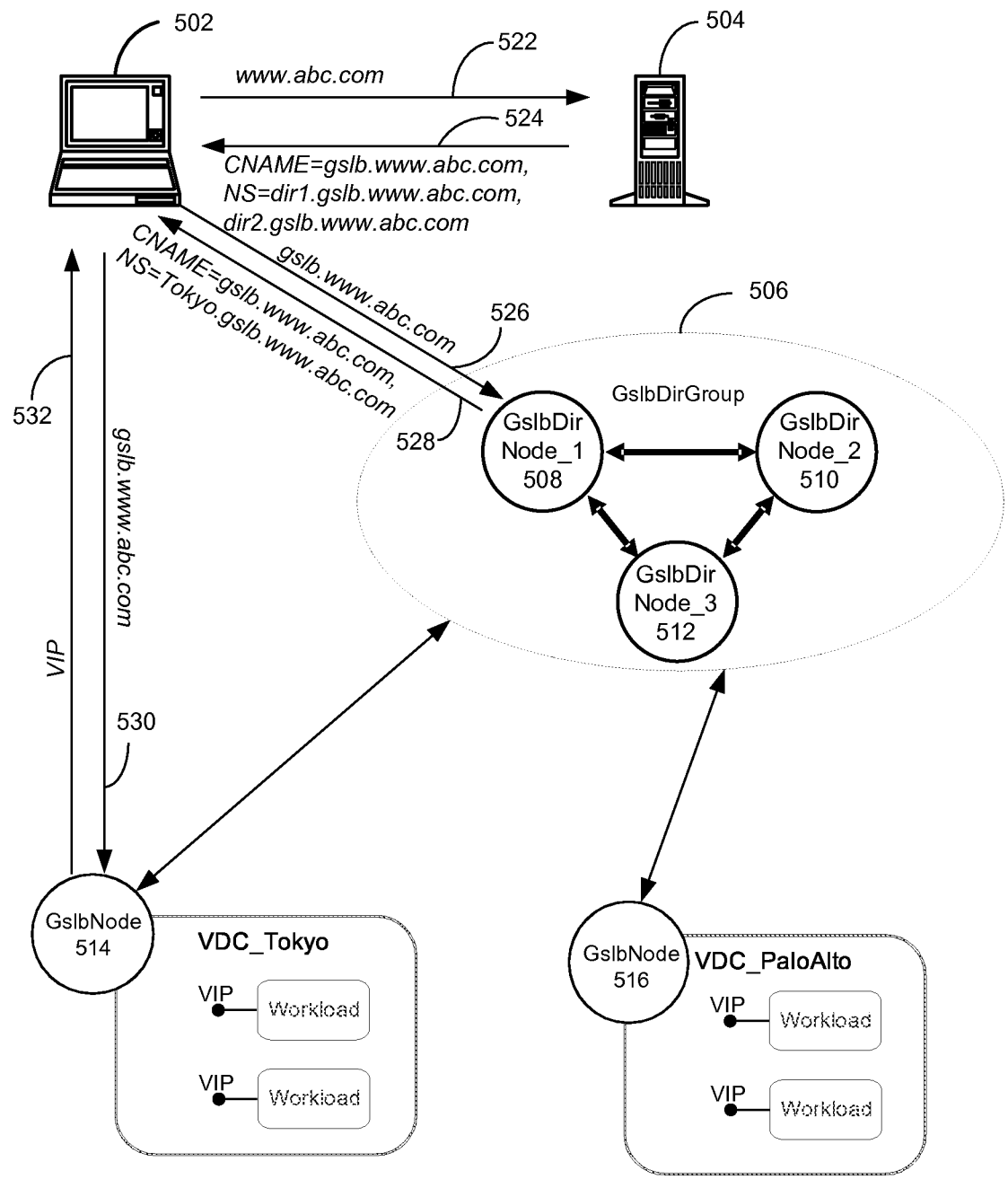
FIG. 5 presents an exemplary workflow of responding client DNS queries.

FIG. 5 presents an exemplary workflow of responding client DNS queries. During operation, a DNS query from a client 502 is directed to an appropriate DNS server 504 (operation 522). For example, a DNS query www.abc.com can be recursively directed to the "abc.com" DNS server. DNS server 504 responds with a DNS response that indicates the canonical name (CNAME) of the queried name and the name server to which the DNS request should be directed (operation 524). Note that, to provide GSLB services, the GSLB directory nodes are registered with the DNS server as the authoritative name server for the name space "abc.com." In the example shown in FIG. 5, a GslbDirGroup 506 is registered with the DNS server as the authoritative name server for the name space "abc.com." GslbDirGroup 506 can include a number of GSLB directory nodes, such as a GslbDirNode_1 508, a GslbDirNode_2 510, and a Gslb-DirNode_3 512.

In FIG. 5, the DNS response sent from DNS server 504 to client 502 can be "CNAME=gslb.www.abc.com, NS=dir1.gslb.www.abc.com, dir2.gslb.www.abc.com," which identifies GslbDirNode_1 508 and GslbDirNode_2 510 as the name servers for the namespace "abc.com." Subsequently, client 502 sends the DNS query using the CNAME (gslb.www.abc.com) to one of the identified name servers, such as GslbDirNode_1 508 (operation 526). Gslb-DirNode_1 508 identifies a GslbNode among all registered GslbNodes (such as a GslbNode 514 and a GslbNode 516) that supports the domain name and is closest to client 502 based on the DNS query and the IP location of client 502 and sends a DNS response to client 502, which indicates the identified GslbNode as the name server for the namespace gslb.www.abc.com (operation 528). In the example shown in FIG. 5, GslbDirNode_1 508 may determine that both GslbNode 514 and GslbNode 516 support the queried domain name (gslb.www.abc.com). However, based on the IP of client 502, GslbDirNode_1 508 may return GslbNode

514 because it is located at a virtual data center (VDC) in Tokyo and is closer to client 502.

Subsequently, client 502 submits the DNS query (gslb.www.abc.com) to GslbNode 514 located in the Tokyo VDC (operation 530), and GslbNode 514 responds to the DNS query with the VIP that is available and closest to client 502 (operation 532). Note that the VIP may represent a group of physical servers. Also note that if GslbDirNode_1 508 determines that GslbNode 514 is not operating (based on the absence of normal heartbeat messages), Gslb-DirNode_1 508 may identify the replica for GslbNode 514, which can be GslbNode 516 located at a VDC in Palo Alto, and respond to the DNS query from client 502 with Gslb-Node 516. In such a situation, client 502 will send its subsequent DNS query to GslbNode 516. This arrangement provides intelligent failover without overwhelming the network with traffic. In other words, the detection of a failed GslbNode does not generate traffic for state synchronization among possibly hundreds or thousands of GslbNodes. The directory node can seamlessly redirect DNS queries to existing replicas of the failed GslbNode. All other Gslb-Nodes need not be notified.

Figure 6:
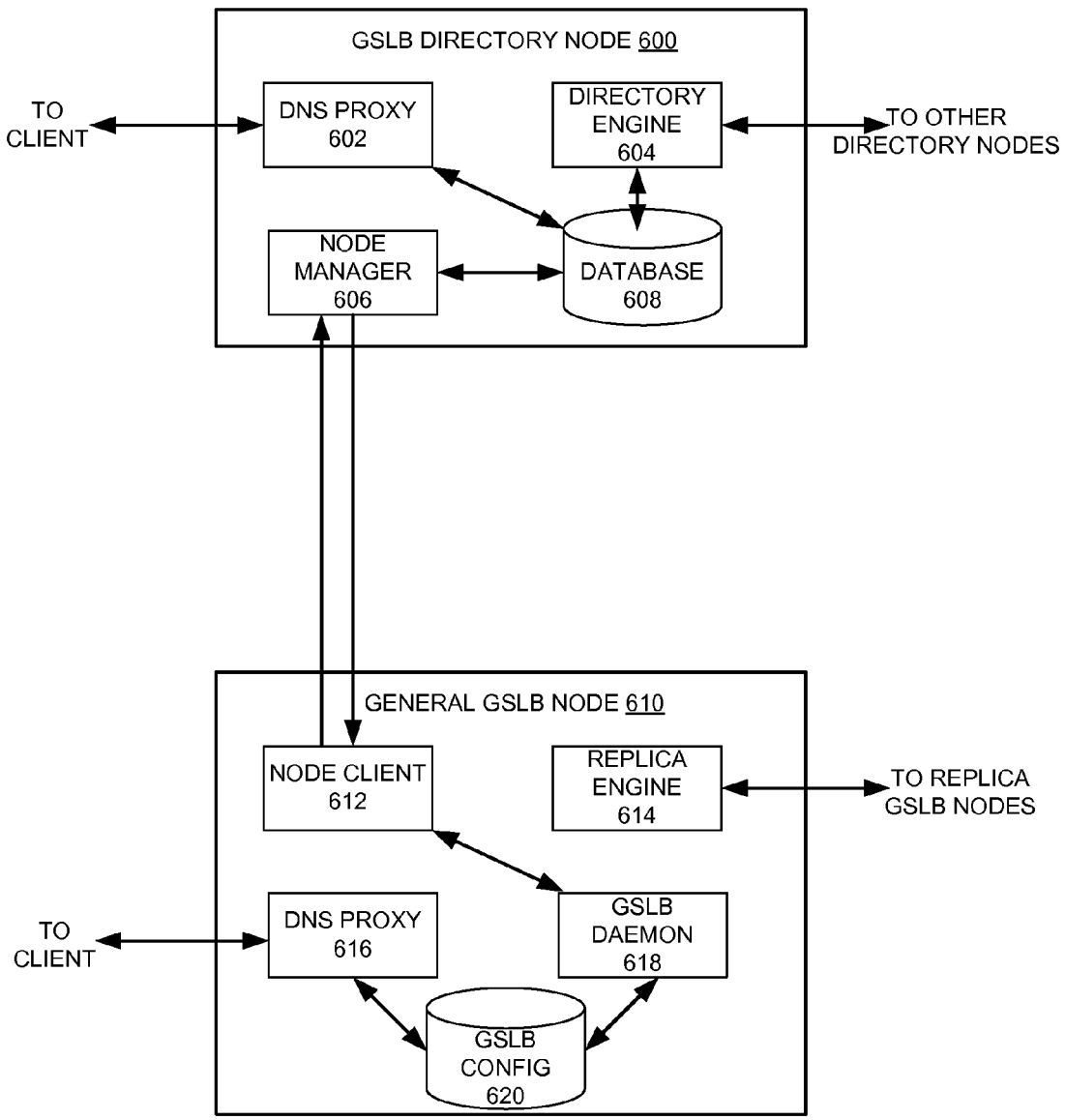
FIG. 6 presents a diagram illustrating the exemplary architecture of a GSLB directory node and a general GSLB node.

FIG. 6 presents a diagram illustrating the exemplary architecture of a GSLB directory node and a general GSLB node. In FIG. 6, GSLB directory node 600 includes a DNS proxy 602, a directory engine 604, a node manager 606, and a directory database 608. General GSLB node 610 includes a node client 612, a replica engine 614, a DNS proxy 616, a GSLB daemon 618, and a GSLB configuration database 620.

Within GSLB directory node 600, DNS proxy 602 is responsible for handling client DNS queries. During operation, upon receiving a DNS query from the client, DNS proxy 602 may determine the location of the client based on the client's IP address and perform a lookup in directory database 608 (which stores metadata of all registered GSLB nodes) to identify a general GSLB node that supports the queried domain name and is closest to the client. In a further embodiment, DNS proxy 602 may run certain balancing algorithms in order to identify a general GSLB node that can best serve the client DNS query. In addition to location, the balancing algorithm may take into consideration the availability and the health status of other qualified general GSLB nodes, and the traffic condition of the current network.

DNS directory engine 604 is responsible for state synchronization among all GSLB directory nodes within the same GSLB directory group. All GSLB directory nodes within the same GSLB directory group are fully synchronized. The GSLB node metadata (which is stored in directory database 608 and is associated with all registered GSLB nodes) is shared among all GSLB directory nodes. In one embodiment, the synchronization among the directory nodes may be performed periodically. In one embodiment, the synchronization is only performed when change (such as addition or removal of a registered GSLB node) occurs on one of the directory nodes. In addition, directory engine 604 is also responsible for handling failover cases. When a GSLB node failure is detected, directory engine 604 looks up directory database 608 for replica nodes of the failed GSLB node and syncs up with other directory nodes regarding the health status of the failed node.

Node manager 606 is responsible for managing communications between the general GSLB node and the GSLB directory node. More specifically, node manager 606 handles registration of the GSLB nodes, and receives heartbeat messages and status reports from the GSLB nodes. During the registration process, node manager 606 receives metadata from the GSLB node and stores the metadata in directory database 608. Moreover, node manager 606 may send commands to the GSLB node. In one embodiment, node manager 606 may send a replica command prompting a GSLB node to send replica data to a different GSLB node.

Node client 612 located within general GSLB node 610 interfaces with node manager 606 located within GSLB directory node 600. More specifically, node client 612 is responsible for registering general GSLB node 610 to GSLB directory node 600. During registration, node client 612 submits metadata associated with general GSLB node 610 to node manager 606. In addition, node client 612 receives commands from GSLB directory node 600 and processes the received commands. Replica engine 614 is responsible for replicating runtime state (such as the RTT cache) as well as GSLB node metadata to selected GSLB nodes.

GSLB daemon 618 performs normal load-balancing services, including running complex load-balancing algorithms (such as RTT-based GSLB algorithms) and monitoring the service health. In one embodiment, GSLB daemon 618 determines which server cluster (represented by a virtual IP) can serve the client request the best based on the RTT data and the performance of the server clusters. Note that runtime data used for running the load-balancing algorithm may be cached. DNS proxy 616 handles client DNS queries and responds to the queries using the load-balancing results from GSLB daemon 618. GSLB configuration database 620 stores the metadata associated with general GSLB node 610, including the GSLB load-balancing configuration for the VDC on which general GSLB node 610 is located.

Note that compared with the conventional GSLB system which relies on centralized GSLB devices to perform DNS load balancing globally, embodiments of the present invention rely on distributed GSLB nodes to perform the DNS load balancing. The GSLB directory nodes perform the first level of global IP mapping and load balancing, which is simple and fast enough to get high RPS (requests per second). Note that this first level load balancing does not involve running complex GSLB algorithms. The GSLB directory nodes then distribute the client DNS queries to the general GSLB nodes which perform the real GSLB load balancing, which can be time-consuming. Since the DNS queries are distributed, the aggregated RPS can be huge. In addition, because there is no need for collaboration among the general GSLB nodes, the system scalability can be high, where hundreds or even thousands of GSLB nodes can be deployed.

In general, within the distributed GSLB system, the data center resources that are to be load balanced are partitioned into multiple GSLB service zones with one GSLB node managing a GSLB service zone. A GSLB service zone can support a number of global IPs or name domains. Note that GSLB service zones may overlap because a global IP may be supported by multiple GSLB service zones. Similarly, the service zones may also overlap in terms of resources being managed because the same resource (such as a server pool) may support multiple domain names. The partitioning enables each GSLB node to provide GSLB services within its own service zone without the need to share the GSLB configuration information and runtime data with other GSLB nodes. Instead, the GSLB node only needs to report its service zoning information to GSLB directory nodes by informing the GSLB directory nodes which global IPs or name domains it supports. The GSLB directory node maintains mappings of the GSLB service zones, and distributes DNS queries to the various GSLB service zones based on the queried names and certain balancing policies. To enable intelligent failover, a GSLB node servicing a particular zone may replicate its GSLB configuration and runtime data at one or more other GSLB nodes, which can provide GSLB services for that zone in the event its own GSLB device fails. Compared with conventional GSLB systems where synchronization among all GSLB devices is required, backing up GSLB data only to a selected few nodes minimizes network traffic.

Figure 7:
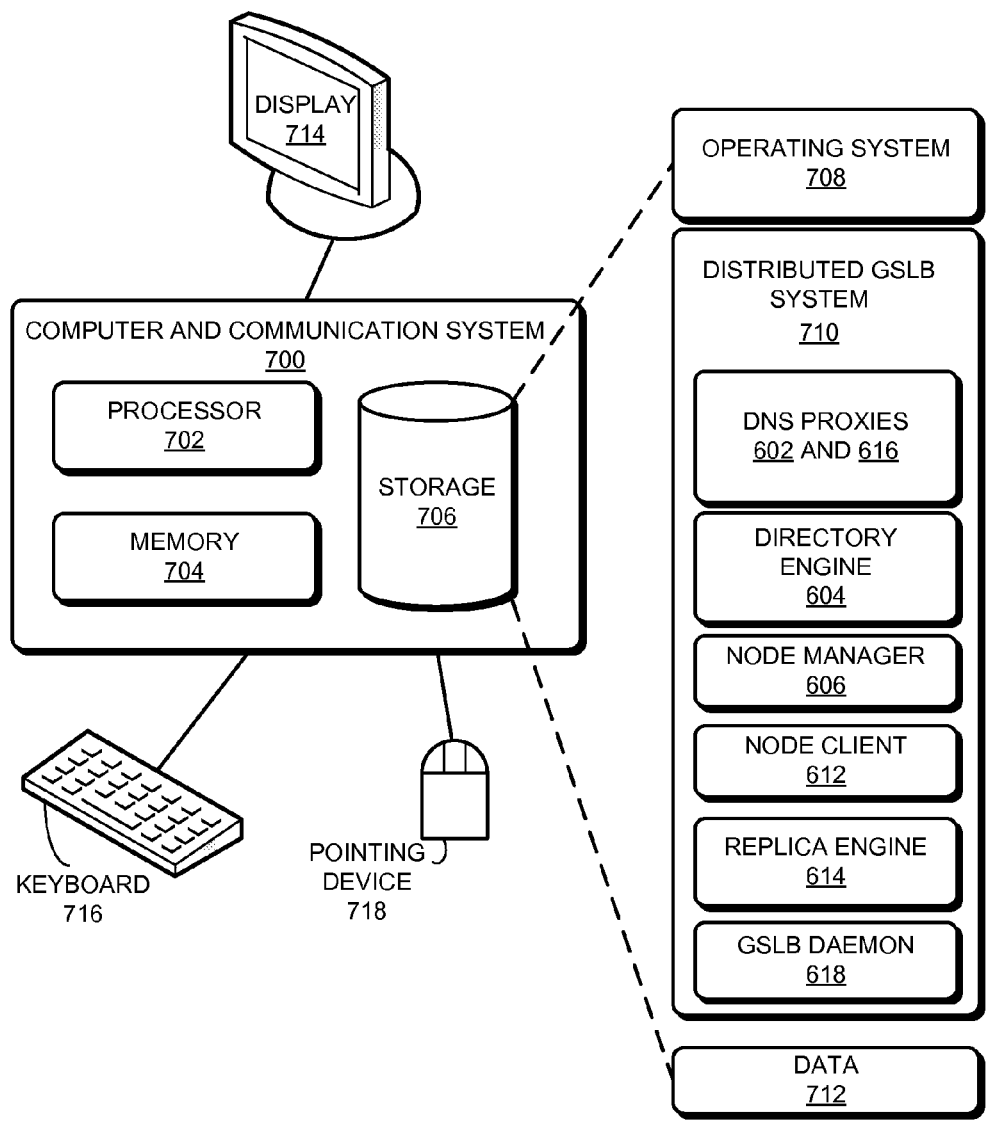
FIG. 7 illustrates an exemplary computer system for providing distributed GSLB services.

FIG. 7 illustrates an exemplary computer system for providing distributed GSLB services. In one embodiment, a computer and communication system 700 includes a processor 702, a memory 704, and a storage device 706. Memory 704 can include a volatile memory (e.g., RAM) that serves as a managed memory, and can be used to store one or more memory pools. Furthermore, computer system 700 can be coupled to a display device 714, a keyboard 716, and a pointing device 718. Storage device 706 can store an operating system 708, a distributed GSLB system 710, and data 712.

Distributed GSLB system 710 can include instructions, which when executed by computer system 700 can cause computer system 700 to perform methods and/or processes described in this disclosure. Specifically, distributed GSLB system 710 may include instructions for receiving and processing client DNS queries (DNS proxies 602 and 616). Further, distributed GSLB system 710 can include instructions for synchronization among directory nodes (directory engine 604) and instructions for registration and monitoring of the general GSLB nodes (node manager 606 and node client 612). Distributed GSLB system 710 can also include instructions for replicating GSLB node metadata (replica engine 614) and instructions for running a normal GSLB service (GSLB daemon 618).

Data 712 can include any data that is required as input or that is generated as output by the methods and/or processes described in this disclosure. Specifically, data 712 can store GSLB directory data and GSLB configuration at an individual GSLB node.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for providing distributed global server load balancing (GSLB) over resources across multiple data centers, comprising:
   registering, at a directory node, a plurality of GSLB nodes,
      wherein a respective GSLB node is configured to provide GSLB services over a respective portion of the resources, and
      wherein the directory node belongs to a directory group comprising multiple state-synchronized directory nodes;
   receiving, at the directory node, a first domain name system (DNS) query from a client;
   selecting, from the plurality of GSLB nodes, a first GSLB node based at least on the first DNS query; and
   responding to the first DNS query with a DNS response that identifies the selected first GSLB node as a name server, wherein the client sends a second DNS query to the selected first GSLB node, wherein the selected first GSLB node performs GSLB in order to resolve the second DNS query.

2. The method of claim 1, wherein registering the respective GSLB node comprises receiving, at the directory node, metadata associated with the respective GSLB node, and wherein the metadata comprises one or more of:
   a node ID;
   an Internet Protocol (IP) address;
   a location; and
   one or more domain names supported by the respective GSLB node.

3. The method of claim 2, wherein selecting the first GSLB node comprises looking up a mapping between the registered GSLB nodes and domain names supported by the registered GSLB nodes.

4. The method of claim 2, wherein selecting the first GSLB node further comprises:
   determining a location of the client;
   determining locations of the plurality of GSLB nodes; and
   determining health status of the plurality of GSLB nodes.

5. The method of claim 1, wherein the data centers include:
   physical data centers; and
   software-defined data centers.

6. The method of claim 1, further comprising:
   sending, from the directory node, a replica command to the respective GSLB node, wherein the replica command prompts the respective GSLB node to send replica data to one or more different GSLB nodes, wherein the replica data includes GSLB configurations and runtime data associated with the respective GSLB nodes, thereby enabling failover to the one or more different GSLB nodes when the respective GSLB node fails.

7. The method of claim 1, wherein the multiple directory nodes are placed at different data centers.

8. A non-transitory computer-readable storage medium storing a program that when executed by a set of processing units provide distributed global server load balancing (GSLB) over resources across multiple data centers, the program comprising sets of instructions for:
  registering, at a directory node, a plurality of GSLB nodes,
    wherein a respective GSLB node is configured to provide GSLB services over a respective portion of the resources, and
    wherein the directory node belongs to a directory group comprising multiple state-synchronized directory nodes;
  receiving, at the directory node, a first domain name system (DNS) query from a client;
  selecting, from the plurality of GSLB nodes, a first GSLB node based at least on the first DNS query; and
  responding to the first DNS query with a DNS response that identifies the selected first GSLB node as a name server, wherein the client sends a second DNS query to the selected first GSLB node, wherein the selected first GSLB node performs GSLB in order to resolve the second DNS query.

9. The storage medium of claim 8, wherein the set of instructions for registering the respective GSLB node comprises a set of instructions for receiving, at the directory node, metadata associated with the respective GSLB node, and wherein the metadata comprises one or more of:
  a node ID;
  an Internet Protocol (IP) address;
  a location; and
  one or more domain names supported by the respective GSLB node.

10. The storage medium of claim 9, wherein the set of instructions for selecting the first GSLB node comprises a set of instructions for looking up a mapping between the registered GSLB nodes and domain names supported by the registered GSLB nodes.

11. The storage medium of claim 9, wherein the set of instructions for selecting the first GSLB node further comprises sets of instructions for:
  determining a location of the client;
  determining locations of the plurality of GSLB nodes; and
  determining health status of the plurality of GSLB nodes.

12. The storage medium of claim 8, wherein the data centers include:
  physical data centers; and
  software-defined data centers.

13. The storage medium of claim 8, wherein the program further comprises a set of instructions for sending, from the directory node, a replica command to the respective GSLB node, wherein the replica command prompts the respective GSLB node to send replica data to one or more different GSLB nodes, wherein the replica data includes GSLB configurations and runtime data associated with the respective GSLB nodes, thereby enabling failover to the one or more different GSLB nodes when the respective GSLB node fails.

14. A system for providing distributed global server load balancing (GSLB) over resources across multiple data centers, comprising:
  a directory group comprising multiple state synchronized directory nodes; and
  a plurality of GSLB nodes registered to the directory group, wherein a respective GSLB node is configured to provide GSLB services over a respective portion of the resources;
  wherein a directory node, stored on a non-transitory machine readable medium of a computer and executed by a set of processors of the computer, comprises:
    a domain name system (DNS) query-receiving module configured to receive a first DNS query from a client;
    a node-selecting module configured to select, from the plurality of GSLB nodes, a first GSLB node based at least on the first DNS query; and
    a DNS query-responding module configured to respond to the first DNS query with a DNS response that identifies the selected first GSLB node as a name server, wherein the client sends a second DNS query to the selected first GSLB node, wherein the selected first GSLB node performs GSLB in order to resolve the DNS query.

15. The system of claim 14, wherein the directory node further comprises a directory database configured to store metadata associated with the plurality of GSLB nodes, wherein the metadata includes a mapping between the plurality of GSLB nodes and domain names supported by the plurality of GSLB nodes.

16. The system of claim 15, wherein the metadata further comprises individual entries corresponding to individual GSLB nodes, wherein a respective entry corresponding to the respective GSLB node includes one or more of:
  a node ID;
  an Internet Protocol (IP) address;
  a location; and
  health status.

17. The system of claim 16, wherein while selecting the first GSLB node, the node-selecting module is further configured to:
  determine a location of the client;
  determine locations of the plurality of nodes; and
  determine health status of the registered GSLB nodes.

18. The system of claim 14, wherein the data centers include:
  physical data centers; and
  software-defined data centers.

19. The system of claim 14, wherein the respective GSLB node further comprises a replica module configured to:
  receive, from the directory node, a replica command; and
  in response to receiving the replica command, send replica data to one or more different GSLB nodes, wherein the replica data includes GSLB configurations and runtime data associated with the respective GSLB nodes, thereby enabling failover to the one or more different GSLB nodes when the respective GSLB node fails.

* * * * *